E. A. HAWTHORNE.
ELECTRICAL CONNECTION.
APPLICATION FILED APR. 4, 1918.
1,378,952.
Patented May 24, 1921.
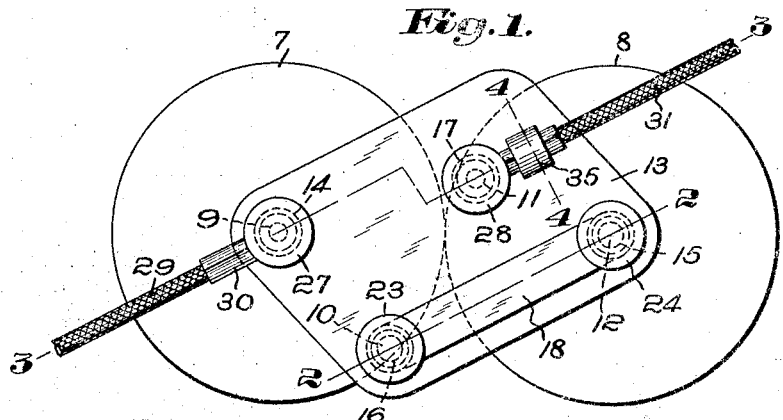
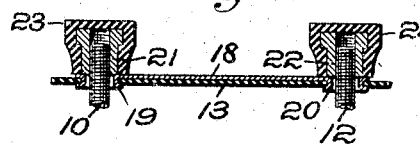
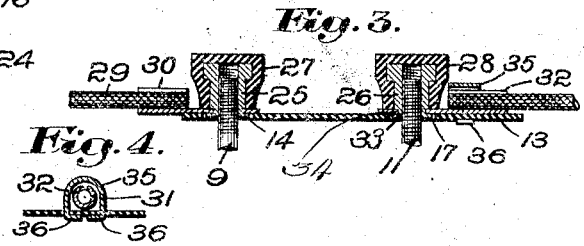
Inventor:
Ellsworth A. Hawthorne
by *[signature]*
Att'ys.

UNITED STATES PATENT OFFICE.

ELLSWORTH A. HAWTHORNE, OF BRIDGEPORT, CONNECTICUT.

ELECTRICAL CONNECTION.

1,378,952.　　　　Specification of Letters Patent.　　Patented May 24, 1921.

Application filed April 4, 1918. Serial No. 226,573.

*To all whom it may concern:*

Be it known that I, ELLSWORTH A. HAWTHORNE, a citizen of the United States, and a resident of Bridgeport, county of Fairfield, and State of Connecticut, have invented an Improvement in Electrical Connections, of which the following description, in connection with the accompanying drawings, is a specification, like characters on the drawings representing like parts.

This invention relates to electrical connections, and is more particularly concerned with a battery connector for connecting together the terminals of two or more batteries.

My invention will be best understood by reference to the following description, when taken in connection with the accompanying drawings of one specific embodiment thereof, while its scope will be more particularly pointed out in the appended claims.

In the drawings:

Figure 1 is a plan of two batteries equipped with a connector embodying my invention;

Fig. 2 is a detail sectional view on line 2—2 of Fig. 1;

Fig. 3 is a detail sectional view on line 3—3 of Fig. 1;

Fig. 4 is a detail sectional view on line 4—4 of Fig. 1;

Referring to the drawings, and to the embodiment of my invention which is illustrated, I have there shown two batteries 7 and 8, herein common dry cells, the battery 7 being provided with usual threaded terminals or binding posts 9 and 10, and the battery 8 being provided with similar terminals or binding posts 11 and 12, as best shown in Figs. 2 and 3. As is usual in dry cells of this type, the terminals 9 and 12 are centrally located, while the terminals 10 and 11 are disposed adjacent the peripheries of their respective cells.

As a means for holding the batteries in proper relation with each other, and to prevent twisting and displacement of the conducting wires, as well as to avoid the possibility of short circuits, I have provided an insulator 13, which may be and is herein in the form of a sheet of insulating material, provided with a plurality of terminal-receiving apertures 14, 15, 16 and 17, to receive the battery terminals. The insulator acts not only to maintain the batteries in proper relation with each other, but also serves as a mounting for a terminal-connecting conductor 18, which overlies the plate 13, and is preferably secured thereto in some appropriate manner. In the present example, said conductor is provided with integral tubular fasteners 19 and 20, best shown in Fig. 2, which may be formed by punching holes in the conductor and riveting or heading the metal over, as clearly shown in Fig. 2, to form tubular rivets. These hollow fasteners then constitute terminal-receiving openings.

Any suitable means may be employed to secure the conductor 18 to the terminals 10 and 12, but in the present example, I have shown nuts 21 and 22, threaded onto said terminals, and preferably provided with insulating shells 23 and 24, respectively, which may be conveniently molded onto said nuts. Similar nuts 25 and 26, best shown in Fig. 3, and also preferably provided with insulating shells 27 and 28, are threaded onto the terminals 9 and 11 respectively. The nut 25 may serve to secure the insulating plate 13 to the terminal 19, as well as to secure to the latter a usual conducting wire 29, which may have a usual terminal 30, best shown in Fig. 1. Similarly, the nut 26 may serve to secure the plate 13 to the terminal 12, as well as to secure to the latter a conducting wire 31 having a suitable terminal 32.

Preferably the nut 26 is permanently joined to the terminal 32 by being mounted to rotate thereon, so that it cannot be accidentally detached therefrom, but may be rotated for the purpose of attaching the same to the terminal 12. To this end, I have provided the nut 26 with a hollow shank 33, best shown in Fig. 3, extending through an opening 34 in the terminal 32, and headed over to a sufficient extent to hold the parts permanently attached, while permitting one to rotate on the other. The nut 25 is attached to the terminal 30 in like manner.

As a means to prevent rotation of the terminal 32, I have herein provided a conductor-receiving guard 35, best shown in Fig. 4, through which the conducting wire 31 and its terminal 32 extend, as best shown at the right-hand side of Fig. 3. This guard may be secured to the plate 13 in any appropriate manner, as by providing such guard with a pair of prongs 36, extending through said plate and bent over, as clearly shown in Fig. 4. It should be evident that by this means, the wire and its terminal are held in proper position, and prevented f. turning or interfering with the other conductors.

The insulating plate 13 may be of any suitable shape, but in the form shown in Fig. 1, the same is rhomboidal,—that is to say, it is a non-rectangular parallelogram. This is the form best suited to a connector having four terminal-receiving apertures, since each of the four corners provides a convenient location for one of the apertures.

Having thus described one embodiment of my invention but without limiting myself thereto, what I claim and desire by Letters Patent to secure is:

1. The combination of two batteries, each provided with a pair of terminals, and a battery-connecting insulating plate having four sides and four corners and provided with four terminal-receiving perforations one adjacent each of said corners.

2. The combination of two batteries, each provided with a pair of terminals, and a battery-connecting insulating plate having four sides and four corners, two of said sides being at an obtuse angle to each other, said plate being provided with four terminal-receiving perforations one adjacent each of said four corners.

3. The combination of two batteries, each provided with a pair of terminals, and a battery-connecting insulating plate having four sides and four corners, and having a generally rhomboidal shape, said plate being provided with four terminal-receiving perforations one adjacent each of said four corners.

4. In a battery connector, the combination of an insulator provided with a plurality of terminal-receiving apertures, a conductor-receiving guard associated with one of said apertures, and a terminal-connecting conductor associated with two of said apertures.

5. In a battery connector, the combination of an insulator provided with a plurality of terminal-receiving apertures, a conductor-receiving guard secured to said insulator adjacent one of said apertures, and a terminal-connecting conductor associated with two of said apertures.

6. In a battery connector, the combination of an insulator provided with a plurality of terminal-receiving apertures, a U-shaped conductor-receiving guard associated with one of said apertures and provided with a pair of fastening prongs extending into said insulator, and a terminal-connecting conductor associated with two of said apertures.

7. In an electrical connection, the combination of an insulator provided with a terminal-receiving aperture, a conductor-receiving guard associated therewith, a conductor extending through said guard and held thereby against rotation, and a threaded conductor-fastener attached to and mounted to rotate on said conductor.

8. An electrical connection comprising, in combination, a conductor provided with an aperture, and a threaded conductor-fastener attached to and mounted to rotate on said conductor.

9. An electrical connection comprising, in combination, a conductor provided with an aperture, and a conductor fastener extending through said aperture and provided with a screw-thread for attachment to a terminal.

10. An electrical connection comprising, in combination, a conductor provided with an aperture, and a conductor fastener provided with an internally threaded shank extending through said aperture and headed over to attach said fastener to said conductor.

11. An electrical connection comprising, in combination, a conductor provided with an aperture, and a conductor fastener provided with a hollow shank extending through said aperture and headed over to attach said fastener to said conductor.

In testimony whereof I have signed my name to this specification.

ELLSWORTH A. HAWTHORNE.